United States Patent [19]

Waddoups

[11] 3,989,942

[45] Nov. 2, 1976

[54] RETRO-REFLECTING LASER RESPONSER AND DATA MODULATOR

[75] Inventor: Ray O. Waddoups, Valencia, Calif.

[73] Assignee: International Telephone and Telegraph Corporation, New York, N.Y.

[22] Filed: Dec. 13, 1974

[21] Appl. No.: 532,516

[52] U.S. Cl. ............................ 250/199; 250/203 R; 343/18 D; 356/152
[51] Int. Cl.² ........................................ H04B 9/00
[58] Field of Search .................. 250/199, 203 R; 356/152, 141, 4, 5; 340/2; 343/18 D

[56] References Cited
UNITED STATES PATENTS

| | | | |
|---|---|---|---|
| 2,956,472 | 10/1960 | Hildebrand | 356/5 |
| 3,344,420 | 9/1967 | Arsove | 343/6.5 |
| 3,504,182 | 3/1970 | Pizzurro et al. | 250/199 |
| 3,511,998 | 5/1970 | Smokler | 250/199 |
| 3,551,050 | 12/1970 | Thorlin | 356/4 |
| 3,863,064 | 1/1975 | Doyle et al. | 250/199 |

*Primary Examiner*—Maynard R. Wilbur
*Assistant Examiner*—S. C. Buczinski
*Attorney, Agent, or Firm*—William T. O'Neil

[57] ABSTRACT

A retro-reflecting laser responser for applications such as IFF and other secure data link applications. A remote (airborne for example) responser, either manually directed or with automatic search and tracking functions, orients its relatively narrow aperture toward the source (a ground laser beacon, for example) of coded interrogation laser beam signals. The remote equipment includes a telescope, preferably of the Cassegrainian type, two-coordinate tracking features, means for recognizing the received beacon coding and for enabling the telescope to reflect the ground transmission. An electro-optic modulation is provided so that the reflected laser energy may be modulated to provide a communication data link back to the source of the laser pulse transmissions.

5 Claims, 1 Drawing Figure

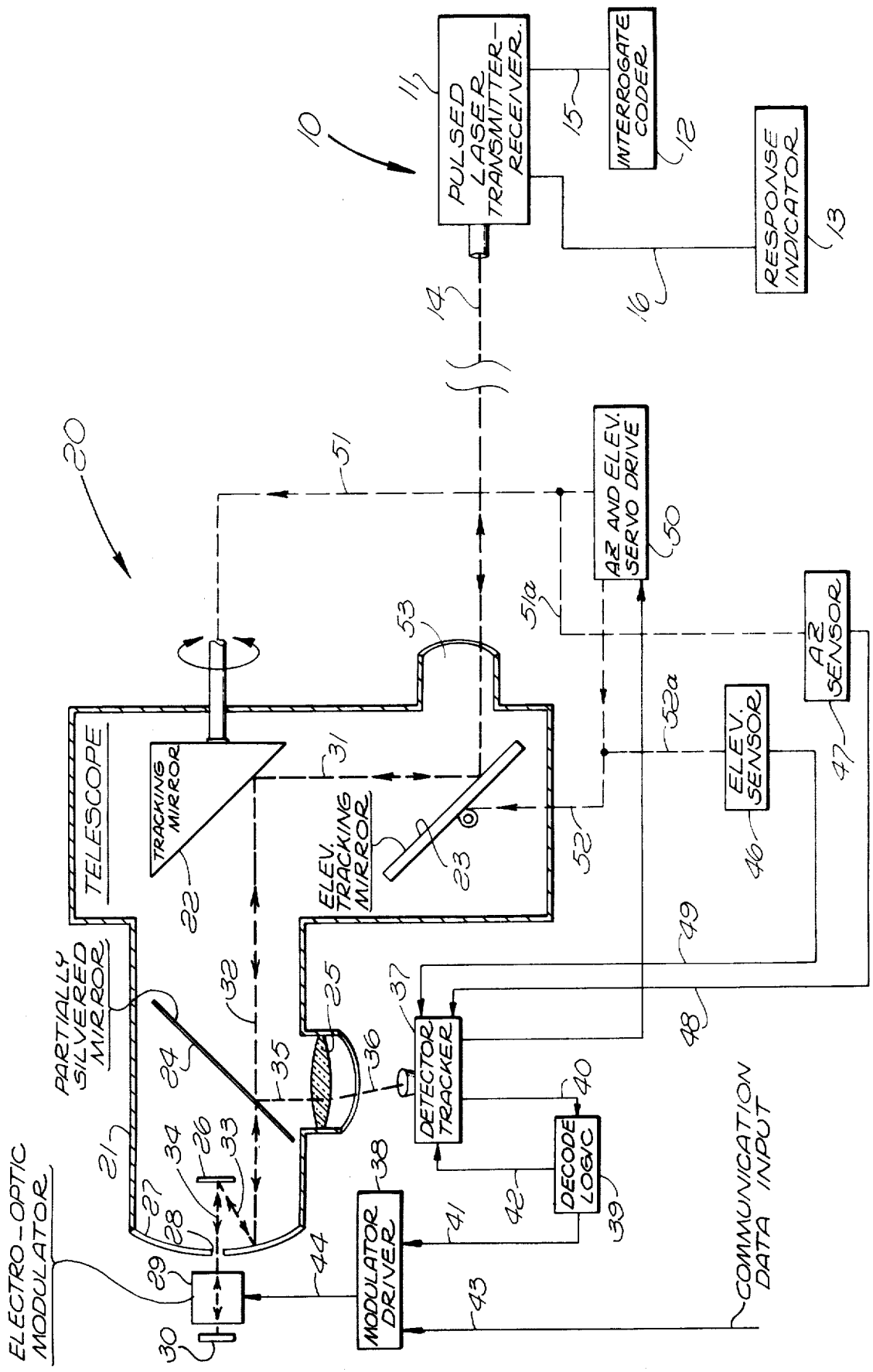

RETRO-REFLECTING LASER RESPONSER AND DATA MODULATOR

BACKGROUND OF THE INVENTION

1. Field of the Invention

The invention relates to electro-optical data links generally, and more specifically to pulse laser responsers.

2. Description of the Prior Art

The most frequently used prior art data link devices are of the radio frequency type requiring a transmitter at the information site and usually arrange to broadcast a broad beam. Those particular facts make the information site vulnerable to detection and interception of the data, as well as subject to various countermeasures.

A particular class of devices which fits that description are the so-called radio and radar beacons (transponders). A specialized type of beacon within that general class of devices is so-called IFF transponder system. The general concept in connection with IFF (Identification Friend or Foe) is that a vehicle, usually an aircraft, approaching an aircraft carrier or other landing area, must be identified so that instructions may be given, or countermeasures initiated or withheld, as required, in the military situation. In civil aviation, this type of relatively automatic identification has applications also, in that the air space in the vicinity of air terminals, is frequently relatively crowded with aircraft of different types having different handling priorities and landing approach requirements.

Although security is a matter of less significance in connection with civil aviation than it is in military aviation, there are, nevertheless, many non-military situations in which the security (non-interceptibility and high immunity to countermeasures) is nevertheless desirable.

A background in radio and radar beacons may be obtained from Chapter 38 of the text "Radar Handbook" by Merrill Skolnik (McGraw-Hill 1970).

Laser communication and object detection systems are also known in the prior art. The particular virtues and special characteristics of coherent light beams (as used in laser equipment) has sparked the development of devices for generating and transmitting laser beams, for modulating and demodulating them, and for otherwise processing them. Certain elements and sub-combinations of the combination of the present invention are therefore known to those skilled in this art, per se, and these will be identified more specifically as this description proceeds.

The aforementioned radar handbook also includes a chapter on laser radars (Chapter 37). Therein, the prior art in respect to laser radars, is well summarized and a very extensive bibliography is appended thereto. Such aspects of the system of the present invention as laser beam tracking, detection and conversion to electrical signal form, as well as certain other known aspects of the instrumentation, are explained.

SUMMARY OF THE INVENTION

It may be said to have been the general objective of the present invention to provide a data link system, including a secure retro-reflecting modulating arrangement at the data origin site, so that data therefrom can be made available to an active interrogation site discretely. The use of coded interrogations and coded replies may be included in the novel combination, essentially in the manner of the aforementioned IFF type system; or data from the information site may simply be extracted in a secure manner by remote station interrogation. The security of the system is based on the fact that laser energy arriving at the information site is remodulated and returned toward the interrogation site along a very narrow beam, and therefore, no active transmitting equipment or broad pattern radiation occurs from the information site.

Without limiting the generality of the present invention, it will hereinafter be explained in the context of the so-called IFF system. Accordingly, the entire system includes a ground based pulse laser transmitter for transmitting a laser energy pattern over a predetermined coverage area, the transmitted light energy therein being modulated according to a predetermined interrogation code. The remote station comprises an aerospace vehicle which receives this ground laser radiation, decodes the pulse modulation thereon and, if it is determined that the said pulse modulation is in accordance with a predetermined format, enables the retro-reflecting function of the airborne equipment. Actually, the tracking telescope input is directed toward the ground laser transmitter and a relatively small portion of the received laser energy is employed in the pulse decoding process. The bulk of the received energy is focused into a relatively small diameter path and directed toward a reflecting mirror which is placed so as to retro-direct the received energy back through the optics of the telescope toward the ground source. Immediately ahead of this reflector is an electro-optical modulator which may be controlled to pass light to and from this terminal mirror with only minimum attenuation, or to modulate the amplitude (intensity) of this received laser light energy before retro-reflection.

Electronic circuitry is included for recognizing the ground transmitted pulse code to enable this electro-optical modulator. The information to be returned or retro-reflected would, in the IFF application being described, by a reply code. The electro-optic modulator is thus electronically interlocked to provide substantially no reflection from the airborne equipment except upon recognition of the ground transmitted code at which time the laser energy received is retro-reflected as a beam modulated by the reply code.

It will be realized from the foregoing that the airborne equipment is passive, that is, it does not transmit per se, at any time. Moreover, the telescope beam angle being quite narrow, it is very difficult to detect the presence of the airborne station, that is, its reply is secure to a very high degree.

The details as to the instrumentation of a system according to the present invention will be hereinafter described.

BRIEF DESCRIPTION OF THE DRAWING

A single FIGURE drawing illustrates the basic airborne and ground located components of an IFF system in accordance with the present invention.

DESCRIPTION OF THE PREFERRED EMBODIMENT

Referring now to the FIGURE, a ground based laser radar station is represented generally by the components at 10, the block 11 representing the pulse laser transmitter itself. Such devices are responsive to electronic control in order to effect the pulse modulation hereinabove referred to. The block 12 is to be understood to contain the electronic control circuits in the form of an interrogate coder which generates and applies to 11 via line 15 the particular pulse code which will interrogate the airborne equipment. Since the transmitter 11 also includes receiving components, it will be understood that the retro-reflected laser energy from the airborne equipment is decoded and reduced to electrical form and presented to a response indicator 13. The aforementioned "Radar Handbook" reference also describes the instrumentation of optical receivers, beginning at Section 37.3. An instrumentation suitable for the components of 11 can accordingly be provided from the skilled practitioner's knowledge in this art.

Referring again to the FIGURE, the components generally assembled at 20 comprise the airborne equipment or remote responser of a system in accordance with the present invention.

A telescope 21 includes an input-output window 53 and receives and retro-directs laser energy along the two-way path 14 between the ground and airborne equipments.

Considering the azimuth and elevation tracking mirrors 22 and 23, respectively, as fixed reflectors for the moment, the telescope 21 and its associated components are best described in conjunction with an operational description.

Assumming the transmission of a coded laser beam from 11 along the path 14, it will be seen that this light energy passes through window 53 and is reflected along the path 31 via mirror 23 to mirror 22 and thereafter along the path 32 to the partially silvered mirror 24. Here the bulk of the light energy continues collinearly, but a relatively small amount of it is redirected along path 35. It is to be understood that these paths or rays 31, 32 and 35 are for illustration only and that light energy actually substantially fills the entire aperture of the telescope 21.

A lens 25 converges the light reflected from 24 to a path 36 into the input of a detector and tracker unit 37.

The detector/tracker unit 37 may be any of several types insofar as the present invention is concerned. For example, the so-called four quadrant arrangement can be used. In that system, the optical field of view is divided into quadrants as if by "cross hairs" of a reticle. Optical sensors then can readily determine the "center of gravity" of the light energy received. For the orthogonal coordinates of tracking control, such a determination is made between the light energy sensed by a first quadrant pair on one side of the reticle, vis-a-vis, the facing pair on the other side of the same reticle. For the other orthogonal coordinate, the sensing or measurement is effected between opposing quadrant pairs on either side of the corresponding orthogonal reticle line.

Obviously, conical scanning can be employed alternatively. Still further, the so-called image disector approach described in the aforementioned "Radar Handbook" text at FIG. 25 in Chapter 37, can be instrumented for this purpose.

The detector/tracker unit 37 output line 45 is actually to be thought of as a two signal path arrangement, so that both azimuth and elevation error or command signals to the azimuth and elevation servo drives 50, are conveyed. From there, mechanical connections 51 and 52 close the servo loop for each of the azimuth and elevation tracking functions. If, for any reason, it is desirable to have analog electrical signals available representative of the tracking mirror positions, sensors or transducers 46 and 47 may be included and coupled to the tracking mirror via the 52a and 51a mechanical linkages, respectively. The result is a pair of corresponding analog signals 48 and 49, as illustrated.

In order to provide the electrical signals for azimuth and elevation servo drives on 45, as hereinbefore described, the detector/tracker unit 37 must contain optical-to-electrical conversion means. Actually these means are associated with the optical tracker elements, and therefore, an electrical output signal may be provided on lead 40, this signal essentially consisting of an electrical analog of the laser beam modulation envelope. Ordinarily, such a signal as on lead 40 would be in the video domain. A decode logic circuit 39 responds to this signal on lead 40 to correlate the received laser beam coding or modulation against a predetermined code to which the logic circuit of 39 responds. This function has a direct parallel in the electronic IFF art.

A recognition, or control signal resulting from correlation of the received code in 39, is provided on 41. That signal is an enabling signal for the modulator driver 38.

Before the outputs of the decode logic 39 are further explained, it is considered desirable to refer again to telescope 21. Following the arbitrary ray 14, as it becomes 31, reflected from mirror 23, and 32 reflected from mirror 22, it has already been indicated that a portion of the laser beam energy is deflected by partially silvered mirror 24, along path 35. The bulk of that laser energy however, proceeds collinearly through the mirror 24 along path 32a. The telescope 21 is depicted as a Cassegrainian type. In such an instrument, a mirror 27 having a central axial opening or bore 28 operates in a well known manner to reflect the received laser rays from 27 to an intermediate mirror 26 and thence out through the bore 28 toward a mirror 30. Thus, the ray 32a is reflected along path 33 to mirror 26 and then along path 34 through the bore 28.

In a Cassegrainian telescope used as a viewing instrument, an eyepiece would be provided outside mirror 27 along the axis of the opening 28. In the arrangement of the present invention however, mirror 30 serves as a retro-reflecting element such that laser energy reaching it is returned by a path 34, mirror 26, path 33 and path 32a, etc., until it finally is directed back toward the pulse laser transmitter receiver 11, along path 14.

The foregoing assumes of course, that element 29, the electro-optic. modulator, is substantially transparent. Hereinafter, it will be explained that this electro-optic modulator can vary its light transmission in accordance with an electrical signal applied from the modulator driver 38, via lead 44.

There are at least several types of electro-optic modulators known which can be used at 29. Among these is the so-called linear electr-optic modulator which is commercially available. Typical devices of the type employ materials such as KDP (abbreviation for $KH_2$, $PO_4$ — potassium dihydrogen phosphate). A deuterated form of KDP noted at KD*P has somewhat better electro-optical properties and therefore, is a commonly used material for such electro-optical modulators. The electrical control signal is generally applied across the crystaline KD*P material as an electric field producing signal, either in the same direction as the light transmission or in a transverse direction. The aforementioned "Radar Handbook" text reference provides a more detailed view of the available prior art in electro-optic modulators beginning on Page 37–26 and continuing through Page 37–30.

Although the electro-optic modulator art permits modulation over a substantial "Gray-scale," the most successful modulation format is generally the digital or pulse-code modulation format. In that mode, the modulator 29 need only operate in two discrete modes, one being as near to zero attenuation transmission as possible, and the other being as close as practical to zero transmission. It is, of course, not necessary that these discrete levels be relatively close to zero and maximum transmission so long as the discrete levels are substantially separated in terms of modulator light transmission. This bi-level modulation format is entirely consistent with the IFF application being described herein, and readily provides for zero (or very low) quiescent response from the telescope.

Referring once again to the detection of the transmitted pulse coding in 37, and the resultant reduction of this data to electrical signal form on the lead 40, it will be observed that the decode logic circuit 39 produces two control signals whenever the said received code matches a stored code within 39. One of these is the signal on 41, and essentially enables the modulator driver 38 permitting it to drive the electro-optic modulator 29 in accordance with a communications data input on 43. This communications data input may be the IFF reply code, or in the broadest sense, may be any other set of data which it is desired to transmit exclusively, in response to the proper interrogation code, from this the information data site, back to the receiver in block 11.

The data to be thus forwarded to the IFF ground position 10, or elsewhere in the general sense, is preferably of the bi-level type consistent with the foregoing discussion of the operation of the electro-optic modulator 29, although it will be understood that other signal formats, such as frequency modulation "gray scale" amplitude modulation, etc., can be employed.

The output signal 42 from the decode logic circuit 39 is provided as an enable or inhibit signal to the tracker portion of block 37. This signal on 42 is provided so that the said tracker can only effect optical tracking when the interrogation code is recognized. In that way, particularly in the IFF utilization, the telescope is not permitted to lock onto an extraneous signal.

It will be noted that the electro-optic modulator 29 affects the light path 34 in both directions, and accordingly, has the effect of providing double the modulation depth as compared to a one-way arrangement.

From an understanding of the principles of the present invention, it will be realized that the telescope 21 could be instrumented other than according to the Cassegrainian arrangement depicted and described, although this particular arrangement is much to be preferred. Various other modifications and variations on the specific instrumentation will suggest themselves to those skilled in these arts, once the principles of the present invention are understood. Accordingly, it is not intended that the drawing or this description should be considered as limiting the scope of the invention, these being typical and illustrative only.

What is claimed is:

1. A secure passive laser data link system having a first pulsed laser transmitter-receiver unit for transmitting a coded modulated laser interrogation beam and for receiving a modulated laser beam, and also having a remote passive transponder, comprising:
   first means within said transponder for interrogation code recognition, said first means including means responsive to said coded modulation on said received laser beams to provide a control output when said coded modulation is determined to be in accordance with a predetermined code;
   second means within said transponder comprising an optical telescope directable toward said first pulsed laser transmitter-receiver unit, said telescope including reflective means within its light path for retro-reflecting said interrogation beam;
   and third means responsive to said first means and inserted in said telescope light path for substantially altering the light transmissability, thereby to substantially reduce said retro-reflection of said interrogation beams in the absence of said first means control output and to permit said retro-reflection when said control output is extant.

2. Apparatus as defined in claim 1 further including means responsive to said light path within said telescope for controlling the orientation of the axis of said telescope in at least one coordinate to track said laser interrogation beam.

3. Apparatus according to claim 1 in which said telescope is of the Cassegrainian type, having a primary concave mirror to receive and retro-reflect said laser interrogation beam over substantially the entire aperture, a secondary mirror located in the vicinity of the point of convergence of light rays with respect to said primary mirror, said secondary mirror being adapted to reflect rays between said primary mirror and an axially centered opening in said primary mirror, and a tertiary mirror for reflecting rays to and from said secondary mirror through said primary mirror opening, and in which said third means is located between said tertiary mirror and the side of said primary mirror opposite said secondary mirror.

4. Apparatus according to claim 1 in which said third means comprises an electro-optic modulator of the type employing crystaline deuterated potassium dihydrogen phosphate as the active element and said first means control output comprises a signal having two conditions consisting of a first level and a second level corresponding to absence of said output applied as a modulating signal to said active element to effect maximum light transmission through said active element during said first level and minimum light transmission during said second level.

5. Apparatus according to claim 4 in which means are included for applying a data signal to said active element to provide for conveyance of additional data from said transponder to said first pulsed laser transmitter-receiver unit during said retro-reflection.

* * * * *